(12) United States Patent
Aue et al.

(10) Patent No.: US 11,480,279 B2
(45) Date of Patent: Oct. 25, 2022

(54) HALF-RING SEGMENT, CONNECTION CLAMP, AND CONNECTION DEVICE

(71) Applicant: Sartorius Stedim Biotech GmbH, Göttingen (DE)

(72) Inventors: Norbert Aue, Bovenden (DE); Sebastian Handt, Göttingen (DE); Sebastian Purmann, Göttingen (DE); Volker Limpert, Morschen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 536 days.

(21) Appl. No.: 16/301,135

(22) PCT Filed: May 5, 2017

(86) PCT No.: PCT/EP2017/060812
§ 371 (c)(1),
(2) Date: Nov. 13, 2018

(87) PCT Pub. No.: WO2017/194419
PCT Pub. Date: Nov. 16, 2017

(65) Prior Publication Data
US 2019/0128456 A1    May 2, 2019

(30) Foreign Application Priority Data

May 13, 2016   (DE) ..................... 10 2016 108 905.2

(51) Int. Cl.
*F16L 37/12*    (2006.01)
*F16L 47/14*    (2006.01)
(Continued)

(52) U.S. Cl.
CPC ........... *F16L 37/1225* (2013.01); *F16L 23/04* (2013.01); *F16L 47/14* (2013.01); *F16L 23/22* (2013.01)

(58) Field of Classification Search
CPC ............ F16L 23/04; F16L 21/06; F16L 47/14
See application file for complete search history.

(56) References Cited

U.S. PATENT DOCUMENTS 2,165,163 A * 7/1939 Waters .................. F16L 37/113
285/91
3,709,526 A   1/1973 Cromie
(Continued)

FOREIGN PATENT DOCUMENTS

DE    10 2014 100 248 A1    7/2015
FR      2 895 057 A1         6/2007
(Continued)

OTHER PUBLICATIONS

International Search Report of PCT Application No. PCT/EP2017/060812, dated Aug. 7, 2017.

*Primary Examiner* — Matthew Troutman
*Assistant Examiner* — Alexander T Rufrano
(74) *Attorney, Agent, or Firm* — Pearl Cohen Zedek Latzer Baratz LLP

(57) ABSTRACT

The invention relates to an annular connection clamp with a first clamping flange (22) which protrudes radially inwards and with an axial counter bearing (24) which is spaced from the clamping flange and which is made of a first and a second half-ring segment (20), each half-ring segment having a first and a second segment end. The first segment end of the first half-ring segment (20) has latching means (281) of a first type, and the second segment end of the second half-ring segment has corresponding latching means (282) of a second type, said latching means being pushed into each other in a tangential direction, thereby being latchable together. The second segment end of the half-ring segment (20) has latching means (282) of a second type, and the first segment end of the second half-ring segment (20) has latching means (Continued)

(281) of a first type, said latching means being pushed into each other in a tangential direction, thereby being latchable together.

11 Claims, 18 Drawing Sheets

(51) Int. Cl.
*F16L 23/04* (2006.01)
*F16L 23/22* (2006.01)

(56) References Cited

U.S. PATENT DOCUMENTS

| | | | |
|---|---|---|---|
| 5,480,193 A * | 1/1996 | Echols | F16L 21/06 |
| | | | 285/318 |
| 8,328,457 B2 | 12/2012 | Werth | |
| 9,012,791 B2 | 4/2015 | Smith | |
| 9,295,825 B2 * | 3/2016 | Biddell | F16L 37/26 |
| 2006/0022465 A1 | 2/2006 | Yamauchi | |
| 2010/0253075 A1 | 10/2010 | Werth | |
| 2016/0074280 A1 | 3/2016 | Miceli et al. | |
| 2017/0001516 A1 * | 1/2017 | Beck | B60K 15/0406 |

FOREIGN PATENT DOCUMENTS

| | | | | |
|---|---|---|---|---|
| FR | 2895057 A1 * | 6/2007 | | F16L 23/04 |
| WO | WO-0235130 A2 * | 5/2002 | | F16L 37/248 |

* cited by examiner a)

b)

HALF-RING SEGMENT, CONNECTION CLAMP, AND CONNECTION DEVICE

CROSS-REFERENCE TO RELATED APPLICATIONS

This application is a National Phase Application of PCT International Application No. PCT/EP2017/060812, International Filing Date May 5, 2017, claiming priority of German Patent Application No. 10 2016 108 905.2, filed May 13, 2016, which is hereby incorporated by reference.

DESCRIPTION

Field of the Invention

The invention relates to an annular connection clamp having a first clamping flange protruding radially inwards and an axial counter bearing spaced axially from said clamping flange and formed of a first and a second half-ring segment, each half-ring segment having a first and a second segment end, wherein the first segment end of the first half-ring segment has latching means of a first type and the second segment end of the second half-ring segment has corresponding latching means of a second type which are pushed into one another in a tangential direction, thereby being latchable together.

The invention further relates to a half-ring segment for forming such a connection clamp.

Finally, the invention relates to a connection device comprising

- a line section with a contact flange located at the end and protruding radially outwards for being contacted by a corresponding contact flange of another line section to be coupled to said line section, and
- an annular connection clamp of the type mentioned above.

BACKGROUND OF THE INVENTION

Such connection clamps, half-ring segments and connection devices are known from U.S. Pat. No. 8,328,457 B2.

For connecting line sections, e.g. hose or pipe sections, among or to one another, so-called Tri-Clamps (synonyms: "Tri-Clover fitting" or "sanitary fitting") are known as standardized connection clamps. Such a Tri-Clamp is understood to be a foldable connection clamp (clamp) having two axial clamping flanges, spaced axially, that are arranged slightly slanted towards one another such that a wedge-shaped annular space forms between them, becoming wider in the radially inwards direction. Such a Tri-Clamp is suited for the aseptic mounting of two line sections, each having a contact flange extending radially outwards at its end and contacting one another with their respective contact surfaces. The connection clamp is folded around the contact flanges in contact with one another in such a manner that the clamping flanges contact the respective backs of the contact flanges. The force applied for folding the connection clamp together is deflected, by means of the slanted areas of the clamping flanges, into an axial force acting as clamping force on the contact surfaces of the contact flanges that are in contact with one another. In order to hold the connection clamp in its closed state, its free ends are connectable with one another. Known from the category-forming patent application mentioned above is a latching function of the free ends of the connection clamp's half-ring segments that are pivotably connected with one another.

What is disadvantageous is the high manufacturing complexity required for such a Tri-Clamp, which, in addition to providing two half-ring segments, also includes their pivotable, and yet preferably non-detachable, connection. The resulting product is, as a rule, a multi-part component composed of different materials. Such complexity can be economically feasible if an often re-used connection element is needed that is supposed to work perfectly even after being frequently opened and closed. In practice, however, more and more often single-use elements, in particular, single-use containers and single-use lines to be coupled to the former are used, and after use are disposed of, together with the connection elements coupling them. Here, above all, more cost-effective and preferably single-material components would be desirable.

From US 2010/0253075 A1, a one-piece, bell-shaped connection clamp is known. Its bell-shaped roof forms a first clamping flange; a second clamping flange is provided at its bell rim and protrudes radially inwards. Due to vertical slots in the bell wall, the bell rim and with it the second clamping flange can be elastically widened. Thus, the bell can be pushed axially over the contact flanges of two line sections, which contact flanges are in contact with one another, holding said line section together in a positive fit. For increasing the clamping force, a nut is screwed onto a male thread of the bell, tightening the bell rim, and with it the second clamping flange, radially inwards. Due to the first clamping flange (bell roof) and the second clamping flange (bell rim) being positioned on a slant relative to one another, a clamping force acting axially on the contact flanges is generated. What is disadvantageous is that one of the two line sections to be coupled must have been pre-assembled before mounting it to the bell and its nut. It is not possible to attach it to standard line sections after the fact, or to replace the connection clamp.

From U.S. Pat. No. 9,012,791 B1, a foldable pipe end protection nut is known. It is to protect sheaths of cables routed in a conduit pipe from being damaged by sharp burrs at the pipe end. Said nut is a screw-on lid with a large central opening, the rim of which is just wide enough to protrude radially inwards over the inner pipe edge with the sharp burrs. In order to be able to mount it when the cables have already been routed inside the conduit pipe, the protection nut is formed of two half-ring segments that are pivotably connected to one another in a common annular plane and the ends of which can be latched to one another.

SUMMARY OF THE INVENTION

The task of the present invention is to refine a category-specific connection clamp, allowing more cost-effective manufacturing, thus making a single-use application more economical, and to achieve a sufficient and sealing clamping force of the contact flanges of the line sections to be coupled to one another possible without a need for additional tools or the use of screw-on nuts and clamping bolts as locking devices as is the case in conventional Tri-Clamp connections. In particular, it is the task of the invention to achieve this without modifying the additional (second) line section that is to be coupled to the first line section and is not actually part of the invention.

This task is resolved, in conjunction with the features of the invention in that the second segment end of the first half-ring segment has latching means of the second type, and the first segment end of the second half-ring segment has latching means of the first type which are pushed into one another in a tangential direction, thereby being latchable with one another.

An alternative solution of this task provides, in conjunction with the features of the invention, for the second segment end of the first half-ring segment to have latching means of the first type, and for the first segment end of the second half-ring segment to have latching means of the second type which are pushed into one another in a tangential direction, thereby being latchable with one another.

The dependent claims relate to preferred embodiments of the invention.

A central idea of the invention is to provide bilateral latching on both segment ends of each half-ring segment instead of the pre-assembled, pivotable connection of the half-ring segments. This creates two latching connections of the same type in which latching means of both the first and second type engage with one another. Each of the two half-ring segments of the inventive connection clamp according to one embodiment has both types of latching means, one each on each of its two segment ends. The half-ring segments of the connection clamp according to the invention according to another embodiment have the same type of latching means on both segment ends. For assembly, two half-ring segments in the case of the first embodiment, preferably formed identically are positioned across from one another with their concave sides facing one another and are moved linearly towards one another such that the segment ends associated with one another perform a tangentially directed linear motion relative to one another. In doing so, each of the corresponding latching means slide into one another and latch. If this assembly is performed around two contact flanges contacting one another such that the latter are encompassed by the clamping flanges of the connection clamp, a sealing connection comparable to the known Tri-Clamp standard results after a twisting and lifting motion of the connection clamp.

The half-ring segments used to form a connection clamp according to the invention are a separate integral part of the invention. This is, in particular, a half-ring segment according to an embodiment, namely a half-ring segment for forming an annular connection clamp according to the invention, having a clamping flange protruding inwards and an axial counter bearing axially spaced from the former, and a first segment end having latching means of the first type and having a second segment end having corresponding latching means of a second type, the latching means of the first type on the first segment being latchable with latching means of the second type on the second segment end of another half-ring segment preferably of the same type by being pushed in a tangential direction into one another, and the latching means of the second type being latchable with latching means of the first type on the first segment end of the additional half-ring segment by being pushed in a tangential direction into one another.

An alternative half-ring segment according to an embodiment for forming an annular connection clamp according to the invention has a clamping flange protruding inwards, an axial counter bearing spaced axially from the former, a first segment end having latching means of the first type, and a second segment end having latching means of the first type, with the latching means of the first type on the first segment end being latchable with latching means of the second type on the second segment end of another half-ring segment by being pushed in a tangential direction into one another, and the latching means of the first type of the second segment end being latchable with latching means of the second type on the first segment end of the other half-ring segment by being pushed in a tangential direction into one another.

The axial counter bearing can be embodied as a ramp section or as a slanted slot.

The half-ring segments according to the invention can be manufactured as simple injection-moulded parts made of plastic. Additional pre-assembly is not necessary, making production cheaper. In particular, in the preferred case where the connection clamp according to the invention is to be formed of two identically formed half-ring segments, further cost decreases will result.

However, a problem could be that the clamping force between the line sections depends directly on the fitter's manual force with which the fitter pushes the half-ring segments together. While this manual force can be increased by using tools, this renders the assembly process slower and more complicated. This problem is not specific to the connection clamp according to the invention, but it also exists in conventional foldable Tri-Clamps.

A refinement of the invention thus relates to a connection device according to an embodiment, namely a connection device comprising a line section having a contact flange at the end protruding radially outwards for being contacted by a corresponding contact flange of an additional line section to be coupled to said line section, and an annular connection clamp according to the invention, wherein the line section is embodied as a pipe-like connection piece with first threaded means spaced axially from the contact surface of its contact flange, and the axial counter bearing of the connection clamp is embodied as a second threaded means corresponding to the first threaded means.

A first aspect of this refinement is to modify the first line section as compared to the Tri-Clamp standard, in particular, to expand it by means of first threaded means spaced axially from the contact surface of its contact flange. Various exemplary embodiments are mentioned below for the specific design of the threaded means.

A second aspect of this refinement is to also modify the connection clamp accordingly; in particular, to use, instead of a second clamping flange, a second threaded means interacting with the first threaded means of the connection piece for forming a threaded connection.

The connection clamp is first mounted, in the manner according to the invention generally described above, around the contact flanges of the line section and the additional line section that contact one another, such that the clamping flange contacts the back of the contact flange of the additional line section, and the first and second threaded means engage with one another to form a threaded connection. Here, optionally, a preliminary clamping force can already be generated on the contacting contact flanges, similar to the aforesaid Triclamp principle, by arranging slanted areas of flanges in a suitable manner. Subsequent rotation of the connection clamp relative to the connection piece results, due to the interaction between the first and second threaded means, in an axial motion of the closed connection clamp, and thus in generating an axial force that increases the clamping force acting on the contact flanges. The torque required for this, which must be provided manually, can be quite low, depending on the selected thread pitch and the diameter of the connection clamp. In such a manner, a higher clamping force, and thus better sealing of the connection, can be achieved with lower manual force than in the conventional Tri-Clamp standard.

In a first preferred variant of the connection device according to the invention, it is provided that the first threaded means are embodied as ramp sections that are distributed over the circumference of the connection piece, and that the slanted areas of said ramp sections are arranged on their sides facing away from the contact flange, and the second threaded means are embodied as ramp sections distributed correspondingly over the circumference of the connection clamp, with the slanted areas of said ramp sections being arranged on their sides facing the clamping flange. In such a manner, e.g., twin-start threads are realized, wherein each thread turn has the length of half a turn. The thread turns do not overlap. Thus, the connection clamp is rotatable a maximum of 180° with increasing torque. The advantage of this embodiment is the maximization of the contact surface between first and second threaded means, which contact one another over a wide area when tightened. This prevents deformations that might result in leaks, even if low-deformability plastic is used.

In particular when using essentially non-deformable materials, a second, material- and weight-saving variant can be advantageous in which the first threaded means are embodied as a plurality of local holding lugs distributed over the circumference of the connection piece and protruding radially outwards, and the second threaded means are embodied as an identical plurality of slanted slots correspondingly distributed over the circumference of the connection clamp in the walls of the half-ring segments. This corresponds to the principle of the BNC connectors ("Bayonet Neill-Concelman" connectors) known from electronics. In such an embodiment, the connection clamp can be rotated a maximum of 90°, preferably 45°, with increasing torque.

In order to prevent unintentional release of this coupling, it can be provided in a refinement of the invention that, after tightening a connection of two line sections according to the invention, the connection piece has first safety latching means acting radially outwards, and second safety latching means corresponding to the half-ring segments acting radially inwards which, in an interacting state, counteract a rotation of the connection clamp relative to the connection piece in the release direction. The first and the second safety latching means are preferably arranged in the circumferential direction relative to one another such that they interact with one another only when the connection device is tightened.

Alternatively, the safety latching means can also be an additional recess in the end area of the slanted slot, which recess at least partially receives a holding lug of the line section when the connection device is tightened, preventing the holding lug from moving relative to the slanted slot.

This way, the fitter, who is made aware of the latching process, e.g., by a corresponding latching sound, latching click, or in the form of a mechanical blockage, receives feedback about whether he has adequately tightened the threaded connection yet by rotating the connection clamp in the tightening direction.

The second safety latching means are preferably arranged axially between the clamping flange and the second threaded means. From this follows that in this embodiment the corresponding first safety latching means are arranged axially between the contact surface of the contact flange and the interaction surface of the first threaded means. In the preferred embodiment of the invention, the contact flange and the first threaded means, which both protrude radially outwards beyond the wall of the connection piece, are spaced axially from one another. The first safety latching means can be accommodated in this gap. The corresponding connection clamp has a gap between the clamping flange, which is also axially spaced and protruding radially inwards, and second threaded means, in which gap the second safety latching means can be accommodated in a space-saving manner. The second safety latching means can also be arranged in or on a support structure of the first threaded means. However, embodiments in which the back of the contact flange also carries the first threaded means are also possible. In this case, there is no gap suitable for arranging the first safety latching means between the contact flange and the first threaded means.

Regardless of the actual positioning of the second safety latching means, a preferred embodiment of the invention provides that the second safety latching means are embodied as a manually releasable latching rocker. While this allows the first and second safety latching means to interact with one another to prevent unintended release of the connection made according to the invention, it is still possible to intentionally release the connection if necessary. The person skilled in the art will be able to decide, taking into account the requirements of the individual case, whether a releasable or a non-releasable connection is to be realized, wherein the latching rocker can be provided with an actuating section if the connection is releasable.

The person skilled in the art will have recognized in the context of the above explanations that, due to the required engagement of the first and second threaded means, closing the connection clamp so that it surrounds the clamping flanges of the pipe sections is not possible at all rotational angle positions of the connection clamp relative to the connection piece. Instead, this will typically only be possible at a rotational angle position from which a rotation in the tightening direction is possible. To permit this starting position to be found more easily, one preferred refinement of the invention provides that the connection piece has a first linear guide element extending in a tangential direction, and one of the half-ring segments has a corresponding second linear guide element on the interior wall or as a part of the wall of one of its segment ends. Firstly, these linear guide elements mark the rotational angle position in which the half-ring segments must be disposed relative to the connection piece in order to be able to latch onto one another. Secondly, these linear guide elements also limit the possible movements of the half-ring segments as a consequence of the linear pushing movement towards one another required for latching.

The functions of the linear guide and the safety latching discussed above can be combined in a particularly preferred embodiment. In this case it is provided that the first linear guide element is embodied as a horizontally projecting wing having a radially projecting latching corner acting as the first safety latching means, and that the second safety latching means are embodied as a safety latching boss that protrudes radially inwards from the wall of the associated half-ring segment and is adjacent to a rotation stop that also protrudes radially inwards from the wall of the associated half-ring segment. The horizontally projecting wing has a first edge that is tangential at its starting point and is the first linear guide element. The wing returns radially inwards, forming the latching corner and a second edge at the place where this first edge would intersect with the radial spaced approximately 90° from the starting point. When the connection clamp is tightened by rotation relative to the connection piece, the latching corner moves with minimal clearance along the connection piece's interior wall until the second edge of the latching corner hits the rotation stop protruding from the interior wall of the connection clamp. Shortly before this occurs, however, the latching corner passes the safety latching boss, which is only slightly higher than the clearance between the latching corner and the interior wall of the connection clamp, but can, however, be overcome due to elastic deformation of the elements involved. The latching corner is thus latched between the rotation stop and the safety latching boss. Depending on the shape of the safety latching boss and/or latching corner, this latching can be releasable or non-releasable.

It can be advantageous when the linear guide element of the half-ring segment has a latching clamp at its front end. In its pre-assembly position, this latching clamp applies a clamping force on the linear guide element of the connection piece, thus restricting both axial movement and rotation of the half-ring segment relative to the connection piece.

This way, the fitter, who is made aware of the latching process, e.g., by a corresponding latching sound, latching click, or in the form of a mechanical blockage, receives feedback about whether he has adequately arranged the half-ring segment on the connection piece.

When the half-ring segments are brought into a final assembly position, the linear guide elements of the connection piece are moved out of the latching clamp, and there is a sliding movement along the interior sides of the linear guide elements of the half-ring segment.

This way, the fitter, who is made aware of the latching process, e.g., by a corresponding latching sound, latching click, or in the form of a mechanical blockage, receives feedback about whether he has adequately joined the half-ring segments.

It can be advantageous when an elastic resetting element is arranged on the interior side of the half-ring segment between the segment ends of a half-ring segment. This resetting element is designed such that the resetting element applies a resetting force on the half-ring segment, this resetting force countering the force necessary for moving the half-ring segments from a pre-assembly position to a final assembly position. Releasing the latching means thus permits the half-ring segments to be moved from a final assembly position into a pre-assembly position.

The elastic resetting elements are preferably arranged in parallel with the latching means extending in a tangential direction.

Further features and advantages of the invention result from the following specific description and the drawings.

BRIEF DESCRIPTION OF THE DRAWINGS

The drawings show.

DETAILED DESCRIPTION OF PREFERRED EMBODIMENTS

Identical reference numbers and, in some cases, reference numbers marked with primes in the figures refer to identical or analogous elements.

Figure 1:
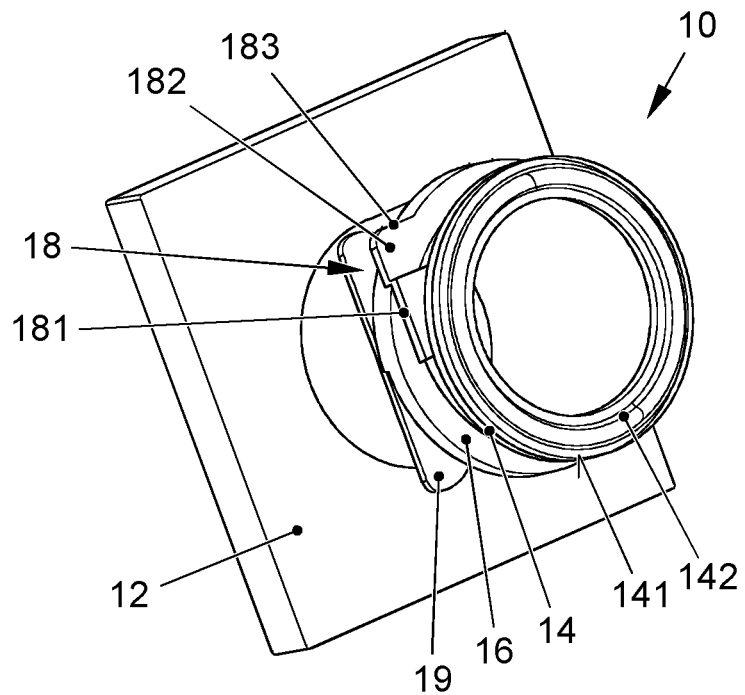
FIG. 1: a perspective view of the connection piece of a connection device according to the invention in a first embodiment.

FIG. 1 shows a line section 10, e.g., a connection piece, in a preferred embodiment of the present invention. The connection piece 10 is secured to the wall 12 of a container (not shown in detail), for example, a bio-reactor or filter capsule. The connection piece 10 is preferably embodied integrally with the container or capsule wall 12. At its free end, the connection piece 10 has a contact flange 14 protruding radially outwards. This contact flange 14 is used for contacting a corresponding contact flange of another line section (not shown) e.g., a hose or a pipe that is to be connected fluid-tight to the container or capsule. In the embodiment shown, the contact surface 141 of the contact flange 14 has an elastic seal 142.

Spaced axially from the contact flange 14, the connection piece 10 is surrounded by a first threaded means, e.g., a ramp ring 16. The ramp ring 16 consists of two ramp sections, each surrounding approximately half of the circumference of the connection piece 10 at a 180° offset. The slanted areas of the ramp sections are located on the side of the ramp ring 16 facing away from the contact flange 14, i.e., at the bottom of FIG. 1. This is clearly apparent in FIG. 1, in particular at the center of FIG. 1, where an edge is visible on the left between the two ramp sections.

A first safety latching means in the form of a horizontally projecting wing 18 can be seen above said edge in FIG. 1. To the left in FIG. 1 the wing 18 has a linear guide element, e.g., a linear guide edge 181 extending in a tangential direction and transitioning into a latching corner 182 before a rear stop edge 183 of the wing 18 again recedes radially inwards. The significance of the linear guide edge 181 and the latching corner 182 and the stop edge 183 shall be described in greater detail below. The support wings 19 are arranged below the ramp ring 16 and shall be explained in greater detail below.

Figure 2:
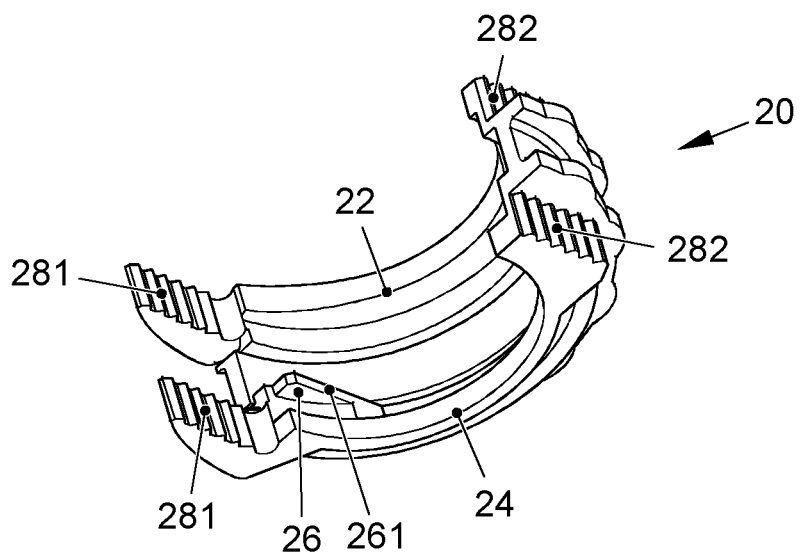
FIG. 2: a perspective view of a half-ring segment according to the invention for forming a connection clamp according to the invention in said first embodiment.

FIG. 2 is a perspective view of a preferred embodiment of a half-ring segment 20 that can be used to form a connection clamp that is itself suited for use with a connection piece 10 according to FIG. 1.

The half-ring segment 20 extends over an arc of approximately 180°. At its upper edge in FIG. 2, it has a clamping flange 22 that protrudes radially inwards. Axially spaced therefrom, i.e., at the opposing edge of the half-ring segment 20, a ramp section 24 extends as a component of an axial counter bearing whose side facing the clamping flange 22 has the slanted ramp area. The slanted ramp area of the ramp section 24 of the half-ring segment 20 corresponds to the slanted ramp area of the ramp sections of the ramp ring 16 of the connection piece 10.

A guide wing 26 whose linear guide element, e.g., a linear guide edge 261, extends in a tangential direction (relative to the associated segment end) can be seen in the axial gap between the clamping flange 22 and the ramp section 24. The linear guide edge 261 interacts with the linear guide edge 181 of the wing 18 on the connection piece 10, as shall be explained in greater detail below.

Latching means extending in a tangential direction are embodied on both segment ends of the half-ring segment 20. On the segment end to the left in FIG. 2 they have the shape of tangentially projecting tabs with latching teeth oriented radially inwards. Hereinafter they shall be referred to as latching means of the first type, which are particularly preferably embodied as latching tabs 281. The latching means of the second type, in the shape of latching bases 282 having latching teeth oriented radially outwards, are embodied on the segment end to the right in FIG. 2. Latching tabs 281 and latching bases 282 are shaped to correspond to one another, as shall be explained in greater detail below.

Figure 3:
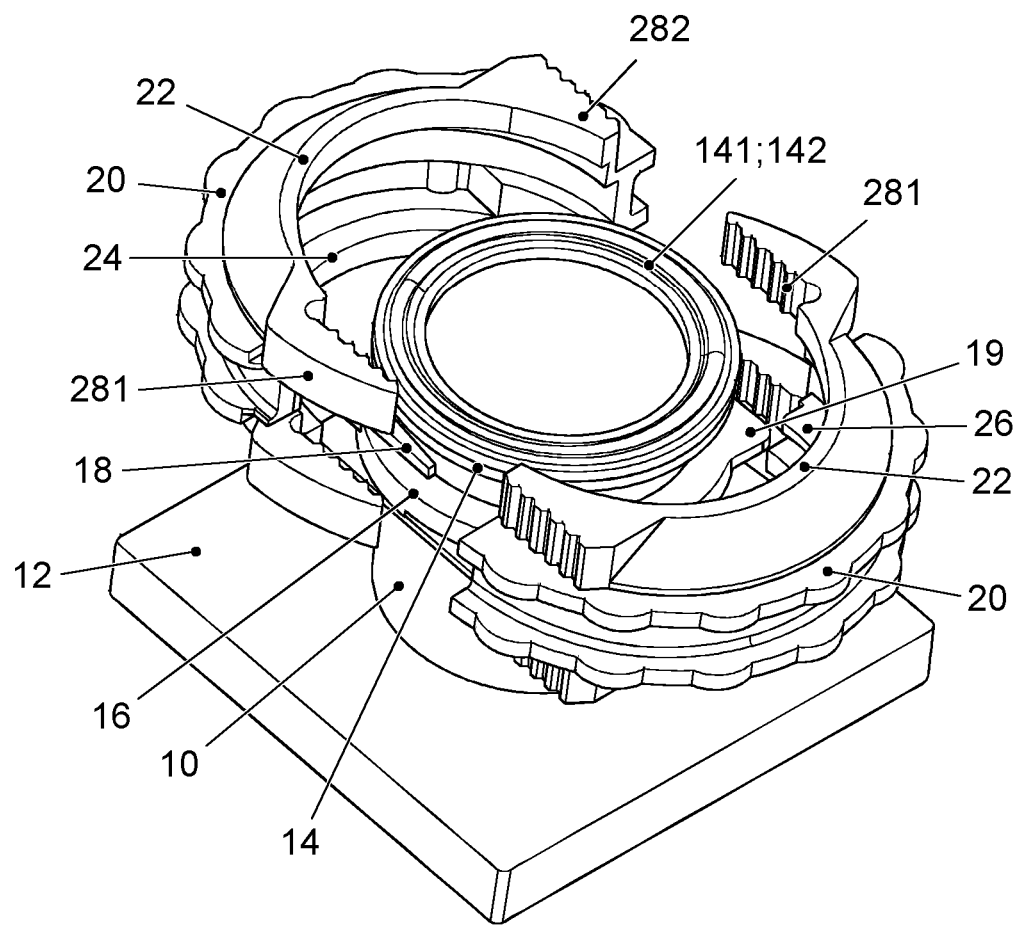
FIG. 3: a perspective view of the connection piece in FIG. 1 and two half-ring segments from FIG. 2 in the preparation position.

FIG. 3 depicts the connection piece 10 from FIG. 1 and two half-ring segments 20 according to FIG. 2 in an exploded view, illustrating a configuration called the preparation position. In this preparation position, the half-ring segments 20 are spaced from one another, but they are already oriented relative to the connection piece 10 in a manner that permits them to be moved into the pre-assembly position shown in FIGS. 4 and 5.

Figure 4:
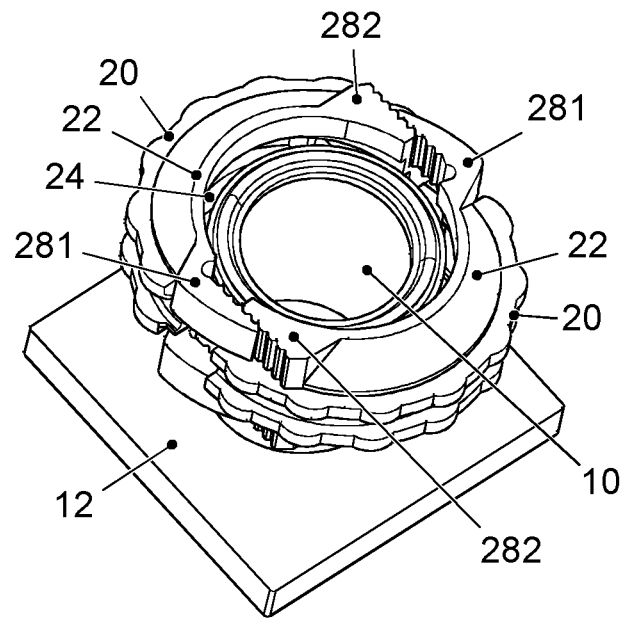
FIG. 4: a perspective view of the elements in FIG. 3 in the pre-assembly position.
Figure 5:
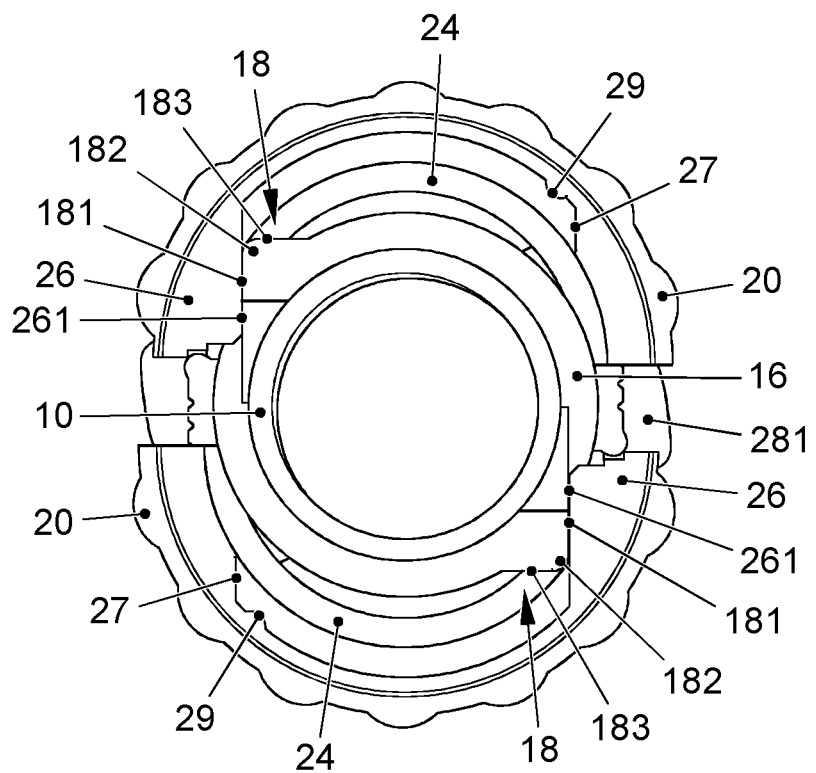
FIG. 5: a cross-sectional view through the arrangement in FIG. 4.

This relative orientation can be explained especially clearly using FIG. 5. It may be seen that the linear guide edges 261 of the half-ring segments 20 contact the linear guide edges 181 of the wings 18 of the connection piece 10. This defines a rotational position for each half-ring segment 20 relative to the connection piece 10. In addition, the two half-ring segments 20 are urged into precise opposition, their concave sides opposing one another. Axial mobility is limited by the undercut of the ramp section 24 of the half-ring segment 20 under the ramp ring 16 of the connection piece 10, as may be seen in FIG. 4. In addition, the wing 18 and the support wings 19, which can be embodied as support protrusions, further limit axial mobility.

As may be seen in FIG. 4, in the pre-assembly position the latching tabs 281 partially overlap the latching bases 282 so that the latching teeth engage with one another and counteract separation due to the half-ring segments 20 being pulled apart from one another; however, the clearance of the resulting connection clamp is still large enough for the first line section to be axially joined to the second line section.

In the pre-assembly position, the half-ring segments 20 are thus secured to the connection piece 10 in a position that only permits the half-ring segments 20 to be pushed further towards one another. In this pre-assembly position, containers or filter capsules can be delivered with the connection piece 10 according to the invention. The end user can then connect an additional line section, as shall be explained in detail below.

This is how the end user places the contact flange 31 of the other line section 30, in particular one shaped according to the conventional Tri-Clamp standard, onto the contact flange 14 of the connection piece 10. Then the two half-ring segments 20 are pushed further into one another, whereby their latching means 281, 282 slide deeper into one another and latch. In this position, the two half-ring segments 20 form a closed annular connection clamp 200. The clamping flanges 22 of their half-ring segments 20 engage behind the back shoulder of the contact flange 31 of the other line section 30. Their ramp sections 24 engage behind the ramp ring 16 of the connection piece 10, whereby the respective ramp slanted areas come to rest against one another. In the embodiment depicted, a mutual axial clamping force of the two contact flanges 31, 14 can already be applied in this position due to the conical design of the back shoulder of the contact flanges 31 of the other line section 30, which design is particularly apparent in FIG. 7, and the corresponding conical design of the other clamping flange 22 of the half-ring segment 20.

Figure 7:
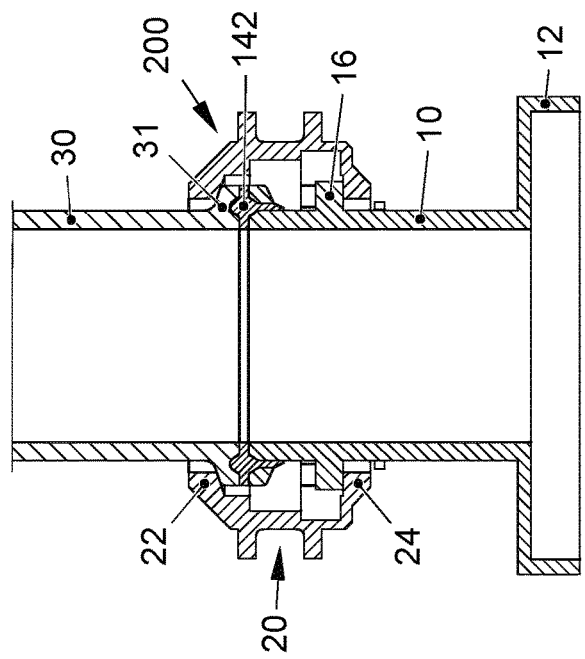
FIG. 7: a longitudinal section view of the arrangement in FIG. 6.
Figure 6:
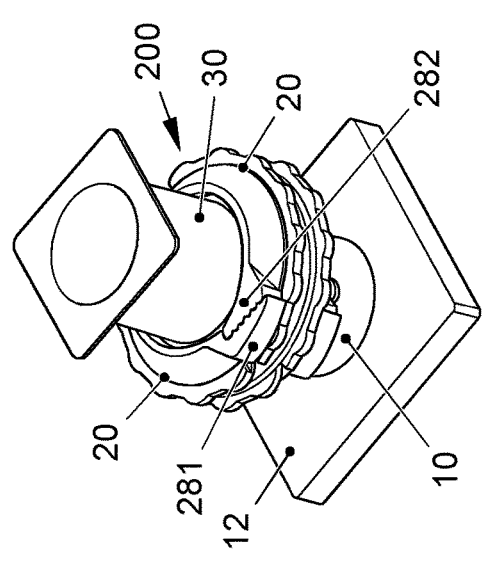
FIG. 6: a perspective view of the connection piece in FIG. 1 and two half-ring segments in FIG. 2 in a latched, non-rotated position.
Figure 8:
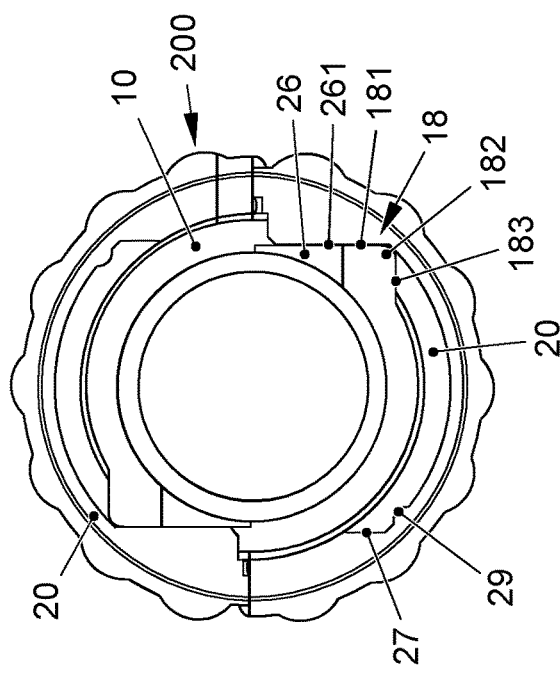
FIG. 8: a cross-sectional view through the arrangement in FIG. 6.
Figure 10:
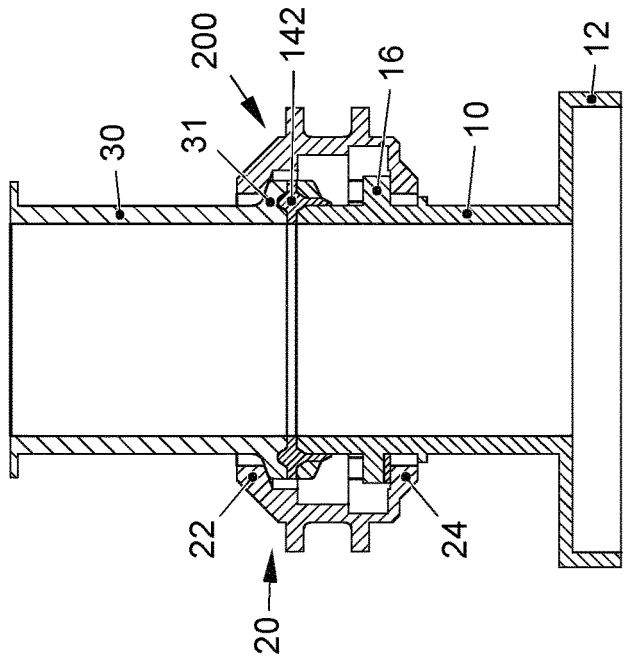
FIG. 10: a longitudinal section view through the arrangement in FIG. 9.
Figure 9:
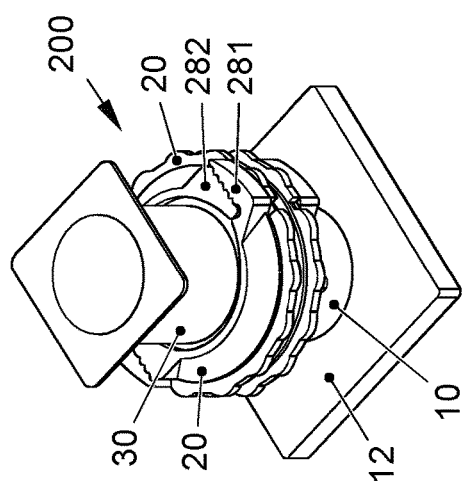
FIG. 9: a perspective view of the connection piece in FIG. 1 and two half-ring segments in FIG. 2 in a rotated final position.
Figure 11:
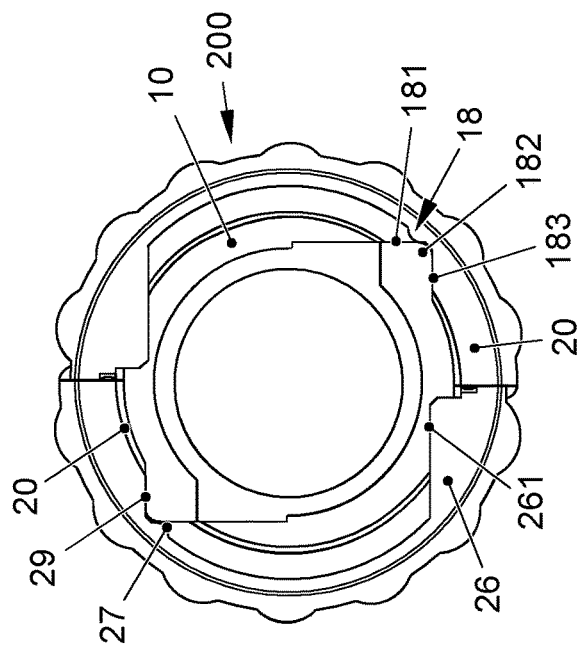
FIG. 11: a cross-sectional view through the arrangement in FIG. 9.

For applying this clamping force, the arrangement of FIGS. 6 through 8 can be moved into the final position depicted in FIGS. 9 through 11 by rotating the connection clamp 200 counter-clockwise 90°. It is not absolutely required that the direction of rotation for achieving the final position be counter-clockwise; instead, a clockwise direction of rotation is also possible, depending on the pitch direction. During this rotation, the slanted ramp areas of the ramp sections 24 of the connection clamp 200 and of the ramp ring 16 of the connection piece 10 engage with one another in a thread-like manner so that the connection clamp 200 is drawn axially towards the connection piece 10. In this process, the clamping flange 22 presses against the rear shoulder of the contact flange 31 of the other line section 30, drawing it to the contact flange 14 of the connection piece 10. This results in sealing clamping of the two contact flanges 14, 31.

In the embodiment depicted, the half-ring segments 20 have two more additional features not yet discussed, which, firstly, provide the user with feedback that the final position depicted in FIGS. 9 through 11 has been reached, and, secondly, prevent unintentional release, i.e., a return to the non-rotated position of FIGS. 6 through 8. In the axial gap between the clamping flange 22 and the ramp sections 24 of the half-ring segments 20, the clearance of the connection clamp 200 is largely designed to be big enough that the latching corner 182 of the wing 18 of the connection piece 10 does not contact the interior wall of the connection clamp 200. Except for in the area of guide wing 26, however, another protrusion of the interior wall of the segment is provided and forms an end stop 27 that the stop edge 183 of the wing 18 of the connection piece 10 hits in the final position. Reaching this stop signals to the user that successful movement into the final position has been attained.

Just before that, however, in the embodiment depicted the latching corner 182 must overcome a safety latching boss 29 disposed in front of the end stop 27. Said latching boss also represents a narrowing of the clearance of the connection clamp 200, which can be overcome, however, due to the material and/or form elasticity of the elements involved. Depending on the specific design, the safety latching boss 29 can be overcome uni-directionally or bi-directionally, the connection of the additional line section 30 to the connection piece 10 being either releasable or non-releasable.

Figure 12:
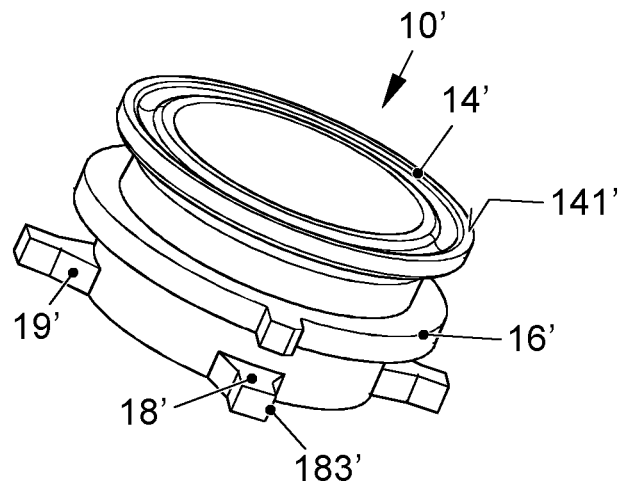
FIG. 12: a perspective view of the connection piece of a connection device according to the invention in a second embodiment.
Figure 13:
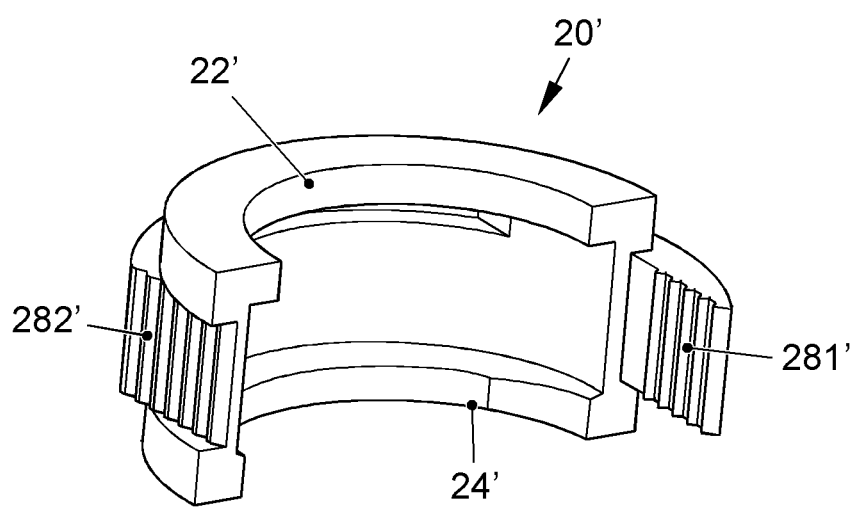
FIG. 13: a perspective view of a half-ring segment according to the invention for forming a connection clamp according to the invention in said second embodiment.

FIGS. 12 and 13 depict a connection piece 10' and an associated half-ring segment 20' according to a second embodiment of the invention. This embodiment has a particularly simple design. The wing 18 of the connection piece 10 of the first embodiment is reduced to a stop protrusion 18' whose stop edge 183' interacts with an end stop (not shown in FIG. 13). Linear guiding and latching in the final position, as are permitted by additional features of the wing 18 of connection piece 10 according to the first embodiment, is not provided in this second embodiment. Apart from this, however, what has been described in the foregoing essentially applies, with analogous elements marked with primes, but otherwise identical in their reference numbers as used in FIGS. 1 through 11.

Figure 14:
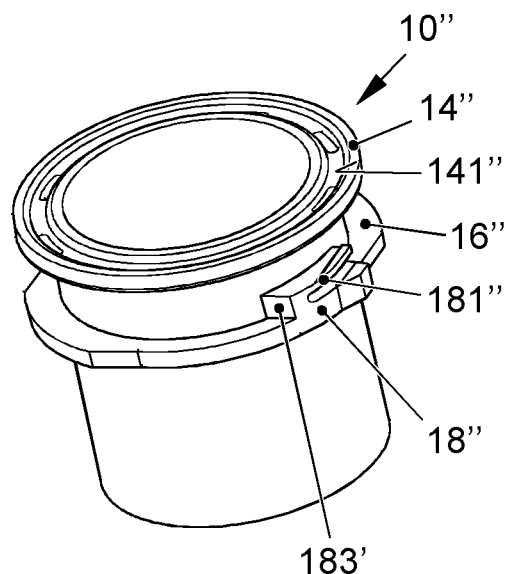
FIG. 14: a perspective view of the connection piece of a connection device according to the invention in a third embodiment.
Figure 15:
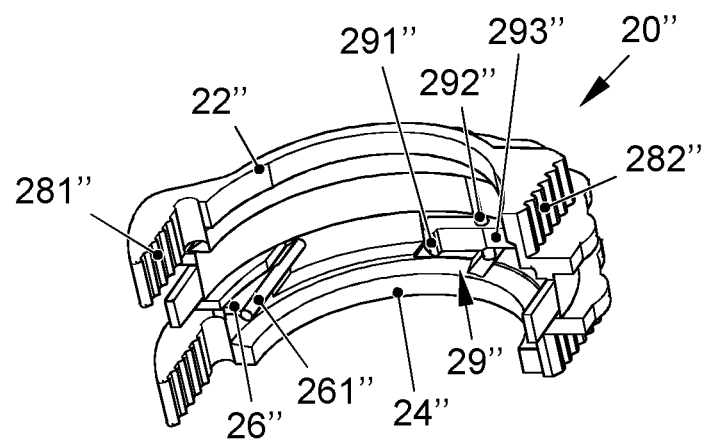
FIG. 15: a perspective view of a half-ring segment according to the invention for forming a connection clamp according to the invention in said third embodiment.

FIGS. 14 and 15 depict a connection piece 10" and a half-ring segment 20" according to a third embodiment. The guide wing 26" of the half-ring segment 20' has a linear guide element, e.g., a round-bolt-like linear guide edge 261". Accordingly, the corresponding wing 18" of the connection piece 10" is equipped with a latching slot 181" instead of a simple linear guide edge 181, so that secure retention in the pre-assembly position is assured.

In addition, instead of the safety latching boss 29 of the half-ring segment 20 of the first embodiment, provided in the third embodiment is a latching rocker 29" whose latching hook 291" latches into a corresponding latching recess of the connection piece 10" in the final position. Due to the rocker-type design of this type of safety latching means, the latch can be manually released, if necessary, by applying manual pressure on the release lever 293" arranged on the other side of the rocker axle 292".

Apart from this, what has been described in the foregoing essentially applies, with analogous elements being marked with double primes, but otherwise identical in their reference numbers as used in FIGS. 1 through 11.

Figure 16:
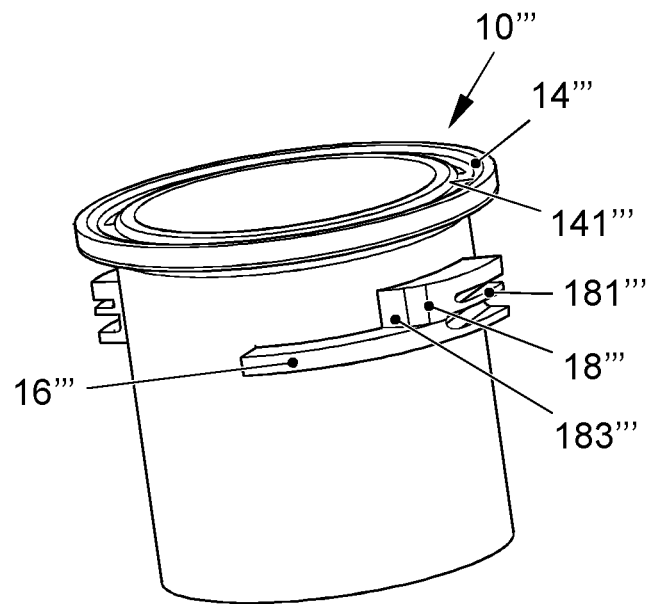
FIG. 16: a perspective view of the connection piece of a connection device according to the invention in a fourth embodiment.
Figure 17:
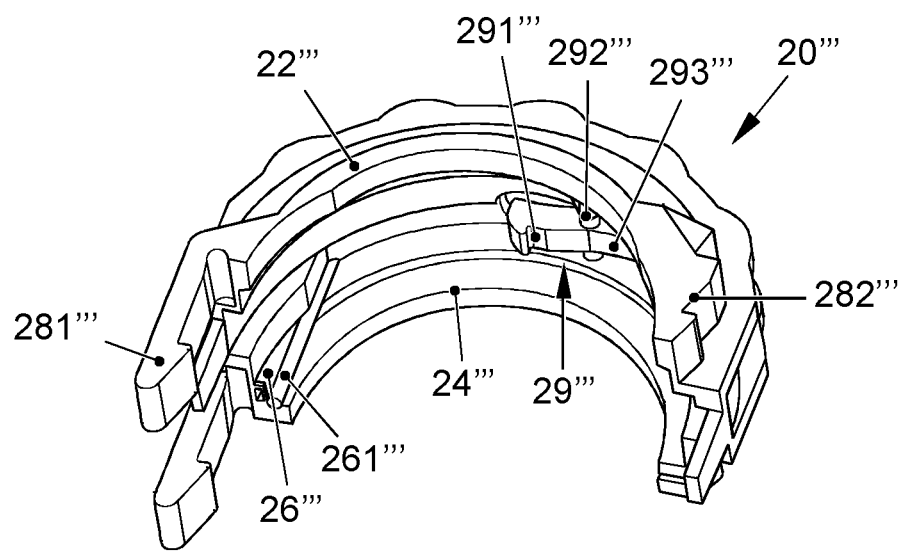
FIG. 17: a perspective view of a half-ring segment according to the invention for forming a connection clamp according to the invention in said fourth embodiment.

FIGS. 16 and 17 depict a connection piece 10''' and a half-ring segment 20''' in a fourth embodiment that essentially differs from the embodiment of FIGS. 14 and 15 in the design of the latching tabs 281''' and latching bases 282'''. While the corresponding elements in the embodiments explained above each have small teeth, the teeth of the latching means 281''', 282''' in the fourth embodiment are reduced to two teeth, corresponding to an exact definition of the pre-assembly position and the latched position. In this embodiment, an unintentional, insufficient closing of the two half-ring segments 20''' is not possible when a connection clamp is formed.

Apart from this, what has been described in the foregoing essentially applies, with analogous elements being marked with triple primes, but otherwise identical in their reference numbers as used in FIGS. 1 through 11.

FIGS. 18 through 27 depict a connection piece 10'''' and an associated half-ring segment 20'''' according to a fifth embodiment of the invention.

Figure 18:
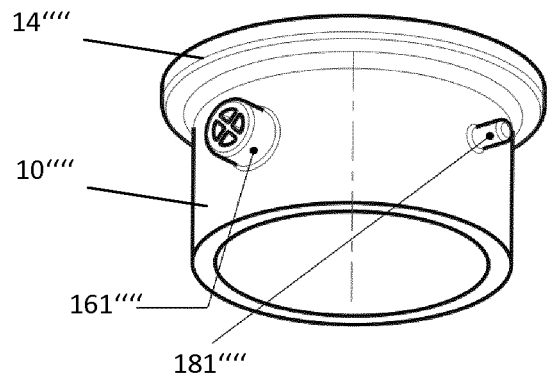
FIG. 18: a perspective view of the connection piece of a connection device according to the invention in a fifth embodiment.

FIG. 18 depicts a connection piece 10'''' having a first threaded means 161'''' on its exterior. The first threaded means 161'''' comprises two local holding lugs projecting radially outwards that are arranged diametrically opposing one another on the exterior of the connection piece 10''''. In addition to the first threaded means 161'''', two linear guide elements 181'''' are arranged on the exterior of the connection pieces 10'''' and are also embodied as local holding lugs projecting radially outwards and are at least largely located in a plane with the first threaded means 161''''. The first threaded means 161'''' forms an angle of approximately 90° with the linear guide elements 181'''.

Figure 19:
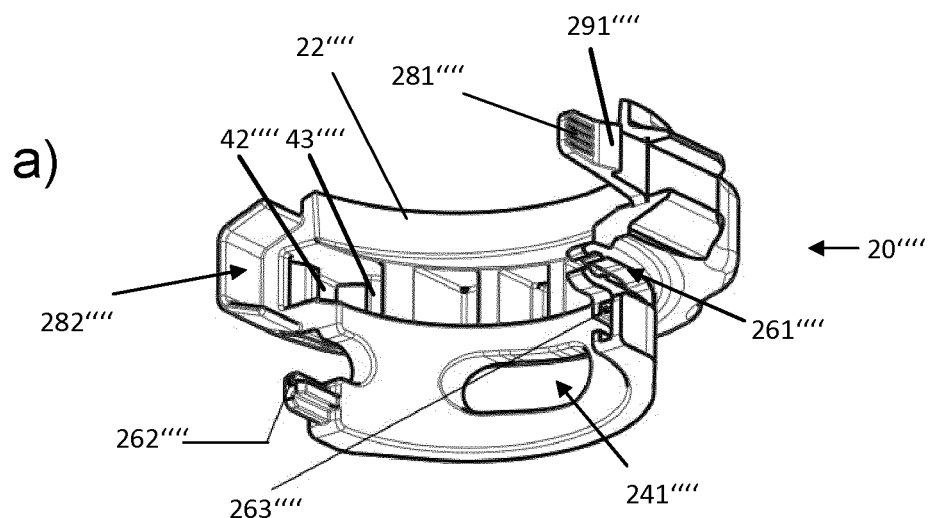
FIG. 19: two perspective views of a half-ring segment according to the invention for forming a connection clamp according to the invention in said fifth embodiment.
Figure 19:
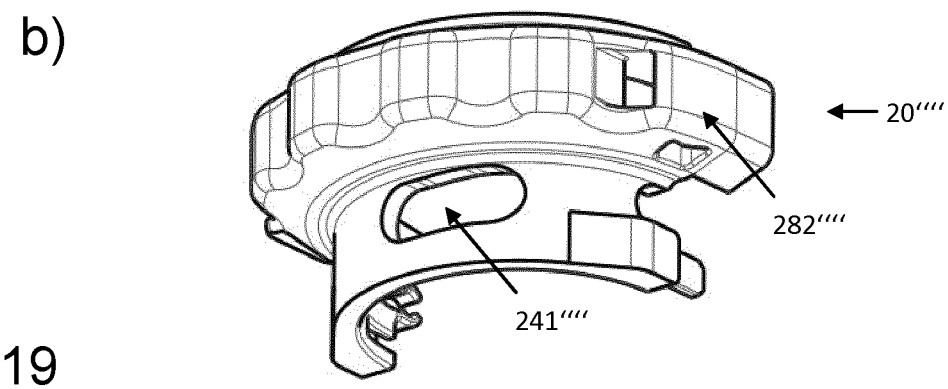

FIG. 19 depicts a perspective front view (FIG. 19*a*)) and a perspective rear view (FIG. 19*b*)) of a half-ring segment according to the invention 20'''' that is suited for use with a connection piece 10'''' according to FIG. 18.

The wall of the half-ring segment 20'''' has a through-opening in the shape of a slanted slot 241''''. This slanted slot 241'''' forms a second threaded means and is designed to interact with the first threaded means. The axial diameter of the slanted slot 241'''' largely corresponds to the diameter of the first threaded means 161''''.

Latching means 281'''', 282'''' extending in a tangential direction are embodied on both segment ends of the half-ring segment 20''''. These take the form of latching tabs with a latching hook 291'''' oriented radially outwards on the right segment end in FIG. 19*a*) and on the left segment end in FIG. 19*b*). These latching means are latching means of the first type. At the left segment end in FIG. 19*a*) and at the right segment end in FIG. 19*b*), latching means of the second type are embodied in the form of through-openings in which the latching means 281"" of the first type can engage and which have at least one latching recess 42"", 43"" in which the latching hook 291"" of the first latching means can engage.

Figure 20:
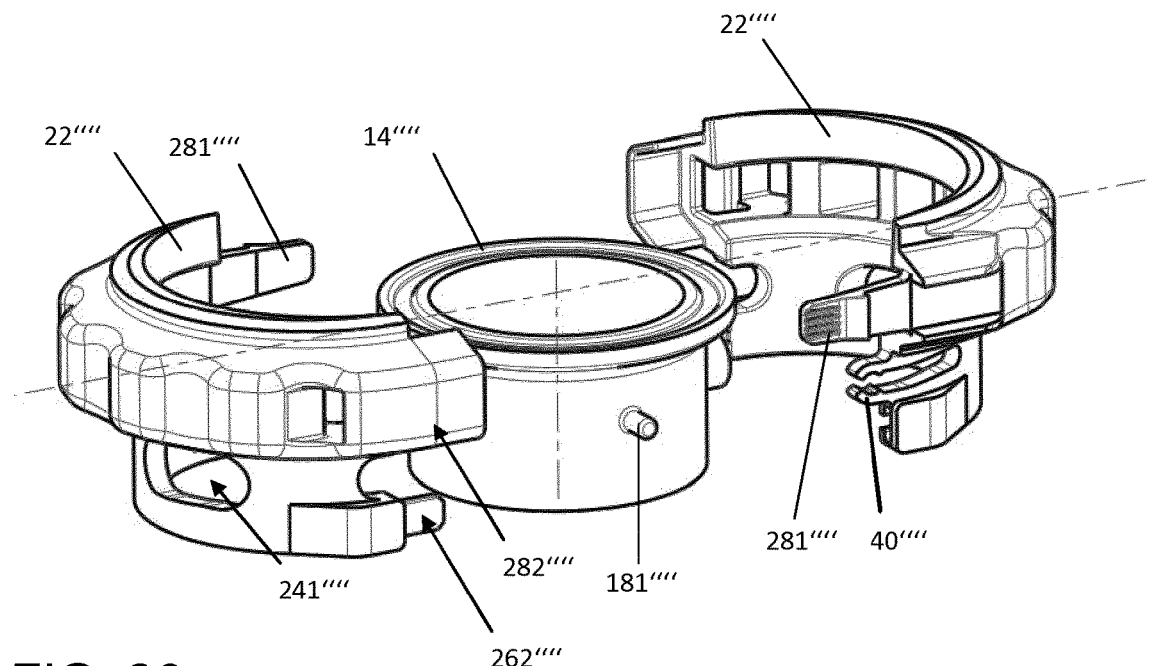
FIG. 20: a perspective view of the connection piece in FIG. 18 and two half-ring segments in FIG. 19 in the preparation position.

FIG. 20 depicts a perspective view of the connection piece in FIG. 18 and the two half-ring segments in FIG. 19 in the preparation position.

Figure 21:
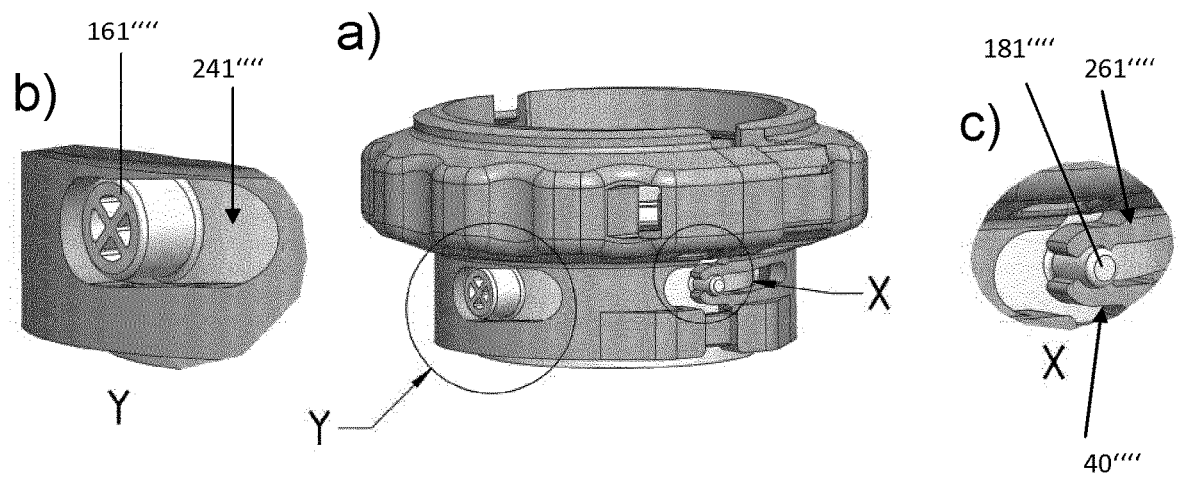
FIG. 21: a perspective view of the elements in FIG. 20 in the pre-assembly position (FIG. 21a)) as well as two detail views (FIGS. 21b), 21c))
Figure 22:
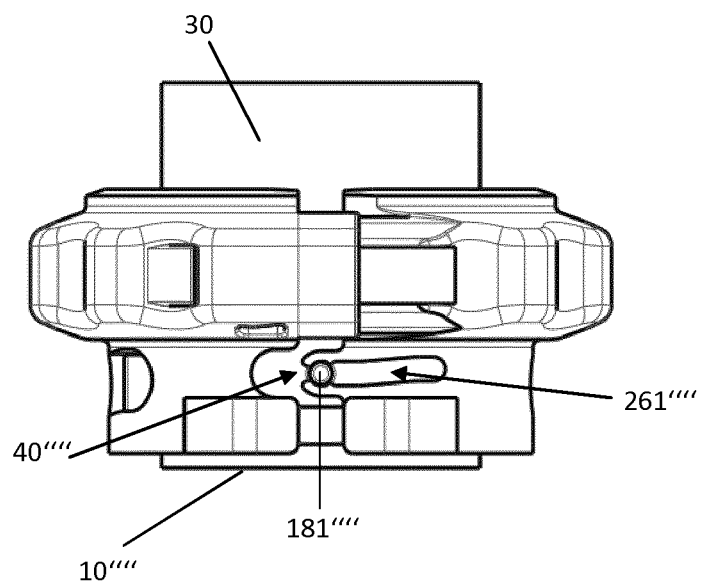
FIG. 22: a side view of the arrangement in FIG. 21.
Figure 23:
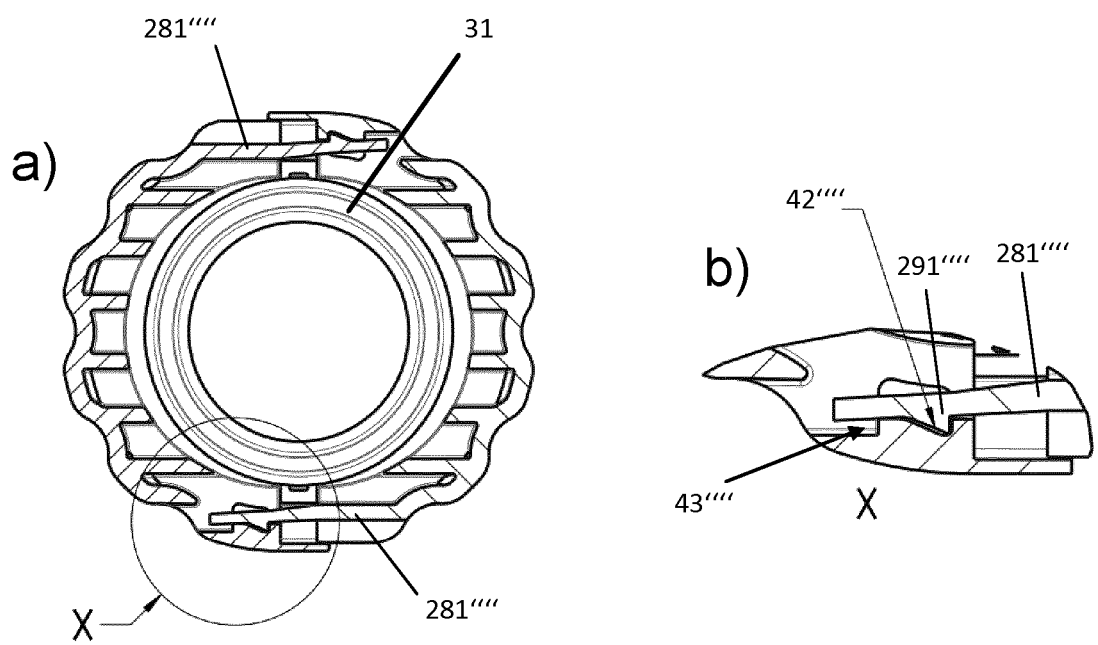
FIG. 23: a cross-sectional view through the arrangement in FIG. 21.

The FIGS. 21 through 23 depict the inventive elements in a pre-assembly position. In this position, the linear guide elements 181"" of connection piece 10"" at least partially contact the interior sides of the linear guide elements 261"" of the half-ring segment 20"". This defines a rotational position of each half-ring segment 20"" relative to the connection piece 10"".

In addition, the linear guide element 261"" of the half-ring segment 20"" has a latching clamp 40"" at its front end that, in the pre-assembly position, applies a clamping force on the linear guide element 181"", thus restricting both axial movement and rotation of the half-ring segment 20"" relative to the connection piece 10"".

As may readily be seen in FIG. 23, in the pre-assembly position the latching hook 291"" of the first latching means engages in a latching recess 42"" for a pre-assembly position. This positive-fit connection between the latching hook 291"" and the latching recess 42"" counteracts separation due to the half-ring segments 20"" being pulled apart from one another, the clearance of the resulting connection clamp, however, being still large enough to allow joining the first line section axially to the second line section.

This way, the fitter, who is made aware of the latching process, e.g., from a corresponding latching sound, latching click, or in the form of a mechanical blockage, receives feedback about whether he has adequately arranged the half-ring segment 20"" on the connection piece 10"".

This is how the end user places the contact flange 31 of the additional line section 30, in particular one shaped according to the conventional Tri-Clamp standard, onto the contact flange 14"" of the connection piece 10"". Then the two half-ring segments 20"" are pushed further into one another, their latching means 281"", 282"" sliding deeper into one another until the two half-ring segments 20"" form a closed annular connection clamp 200 in this position.

Figure 24:
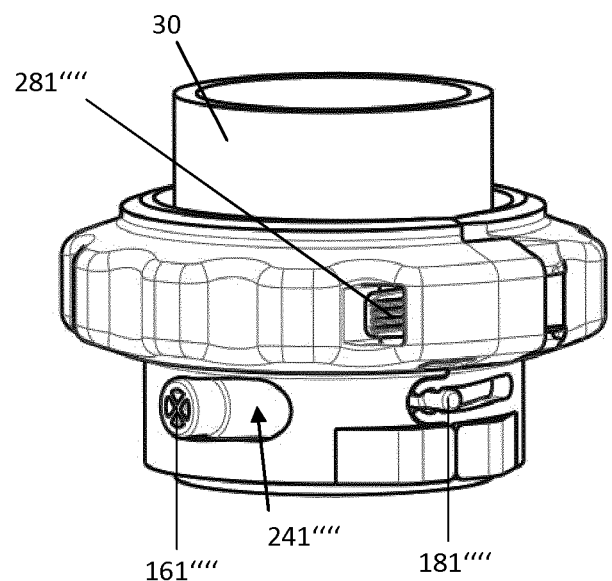
FIG. 24: a perspective view of the connection piece in FIG. 18 and two half-ring segments in FIG. 19 in the latched, non-rotated position.
Figure 25:
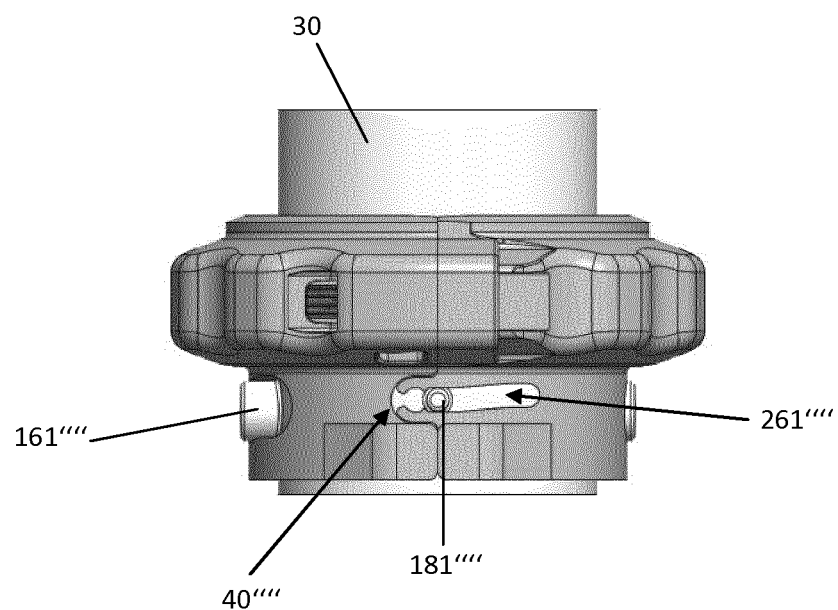
FIG. 25: a side view of the connection piece in FIG. 18 and two half-ring segments in FIG. 19 in the latched, non-rotated position.
Figure 26:
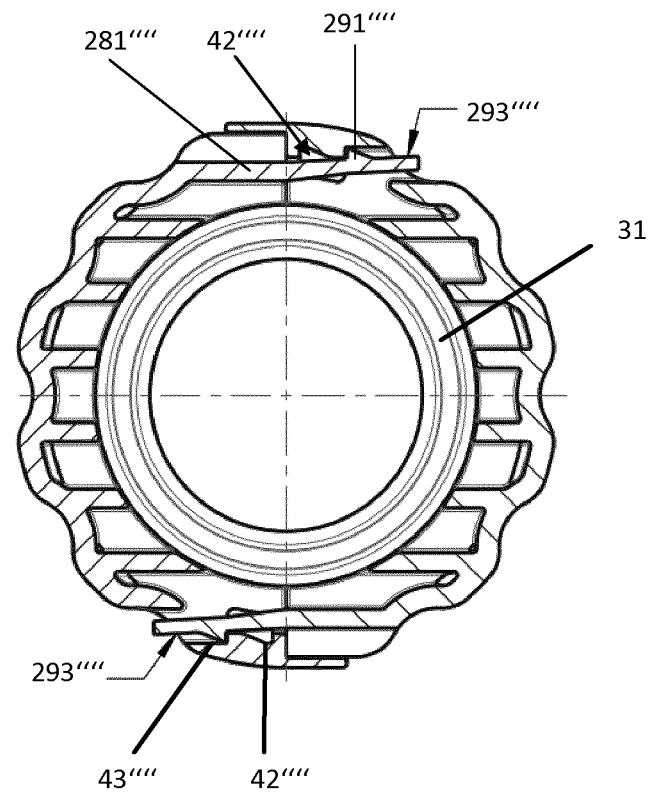
FIG. 26: a cross-sectional view through the arrangement in FIG. 24.

FIGS. 24 through 26 depict the elements according to the invention in a latched, non-rotated final assembly position. Due to the further repositioning of the half-ring segments 20"", the latching hooks 291"" are moved out of the latching recess 42"" and engage in a latching recess 43"" in the final assembly position. In addition, the linear guide element 181"" of the connection piece is moved out of the latching clamp 40"" and slides along the interior sides of the linear guide elements 261"" of the half-ring segment 20"".

This way, the fitter, who is made aware of the latching process, e.g., by a corresponding latching sound, latching click, or in the form of a mechanical blockage, receives feedback about whether he has adequately joined the half-ring segments 20"".

Figure 27:
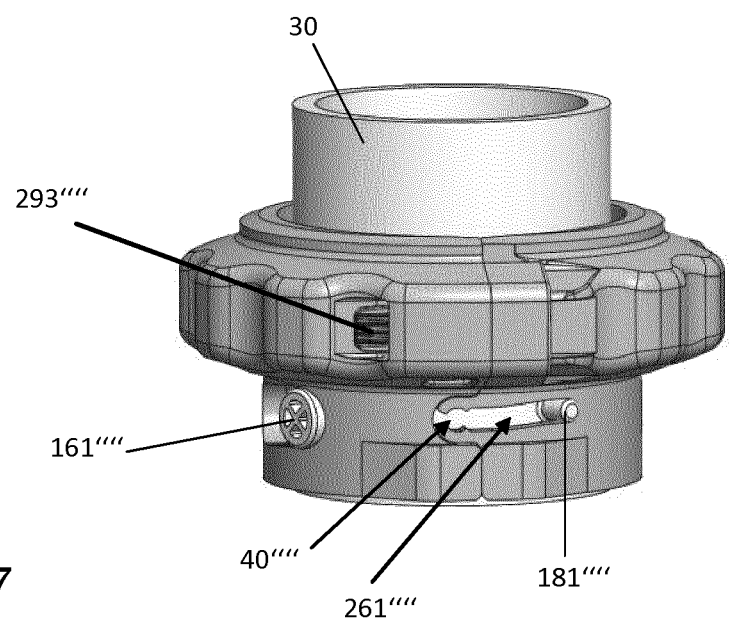
FIG. 27: a perspective view of the connection piece in FIG. 18 and two half-ring segments in FIG. 19 in the rotated final position.

FIG. 27 depicts the inventive elements in a rotated final position. The inventive elements are moved into a rotated final position by means of a rotational movement. The linear guide elements 181"" of the connection piece as well as the first threaded means 161"" slide in the linear guide element 261"" of the half-ring segment 20"" or in the second threaded means 241"" until the linear guide elements 181"" of the connection piece and/or the first threaded means 161"" hit a stop. Usually there is a 45° rotation.

During this rotation, the interior sides of the linear guide element 261"" of the half-ring segment 20"" as well as the interior sides of the second threaded means 241"" interact, like a threaded connection, with the linear guide element 181"" of the connection piece or with the first threaded means 161"" so that the connection clamp 200 is drawn in an axial direction towards the connection piece 10"". In this process, the clamping flange 22"" presses against the rear shoulder of the contact flange 31 of the additional line section 30, drawing it to the contact flange 14"" of the connection piece 10"". This results in sealing clamping of the two contact flanges 14"", 31.

In the present embodiment, the half-ring segments 20"" can be returned to the pre-assembly position from the final assembly position in that a force is applied on the release levers 293"" of the latching means 281"" of the first type, thus moving the latching hooks 291"" out of the latching recesses 43"", allowing the half-ring segments 20"" to reposition away from one another in a tangential direction.

Apart from this, what has been described in the foregoing essentially applies, with analogous elements being marked with quadruple primes, but otherwise identical in their reference numbers as used in FIGS. 1 through 11.

FIGS. 28 through 37 depict a connection piece 10""" and the associated half-ring segments 201""", 202""" according to a sixth embodiment of the invention.

Figure 28:
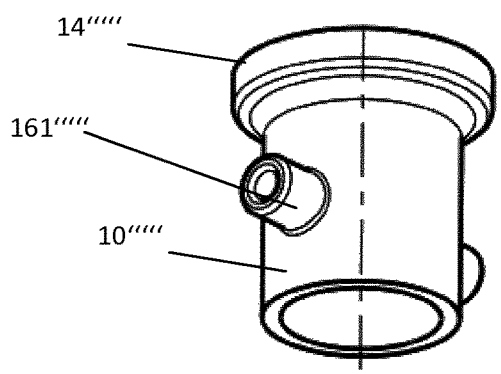
FIG. 28: a perspective view of the connection piece of a connection device according to the invention in a sixth embodiment.

FIG. 28 depicts a connection piece 10""" in an additional embodiment of the invention. The connection piece 10""" differs significantly from the connection piece 10"" in FIG. 18 in that no threaded means are arranged on the exterior of the connection piece 10""".

Figure 29:
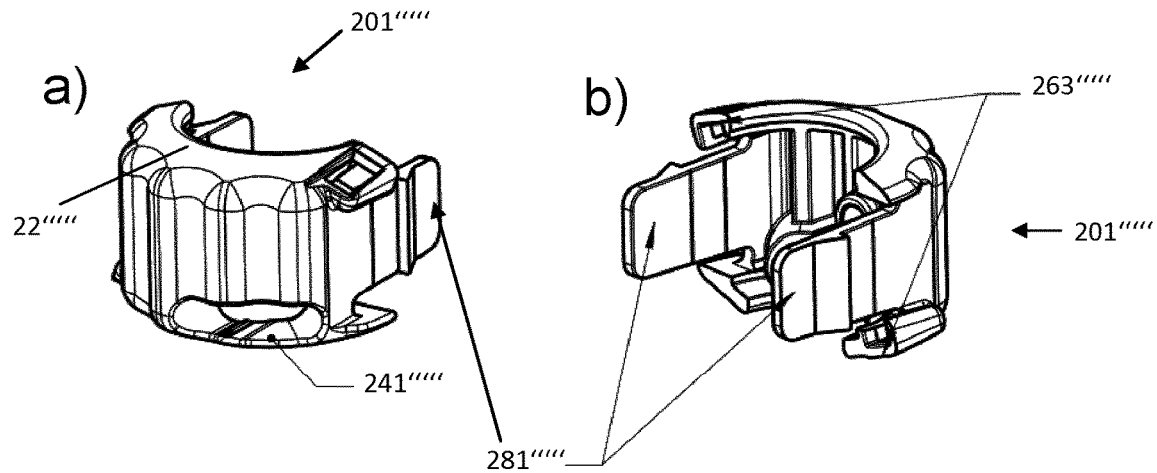
FIG. 29: two perspective views of a first half-ring segment according to the invention for forming a connection clamp according to the invention in said sixth embodiment.

FIG. 29 depicts, in a perspective front view (FIG. 29b)) and a perspective rear view (FIG. 29a)), an inventive first half-ring segment 201""" suited for use with a connection piece 10""" according to FIG. 28.

The half-ring segment 201""" depicted in FIG. 29 has, on both segment ends of the half-ring segment 201""", latching means 281""" that extend in a tangential direction and are in the form of latching tabs with a latching hook 294""" oriented radially outwards. These latching means are latching means of the first type.

In addition, the depicted half-ring segment 201""" has, on both segment ends, linear guide elements 263""" that are embodied as through-openings and are designed such that corresponding linear guide elements 262""" of another half-ring segment 202""" can engage and latch in the linear guide elements 263""".

The linear guide elements 263""" are arranged at different positions on each segment end. While the linear guide element 263""" on the right segment end depicted in FIG. 29b) is arranged in the lower corner of the segment end, the linear guide element 263""" on the left segment end in FIG. 29b) is arranged in the upper corner of the segment end.

Figure 30:
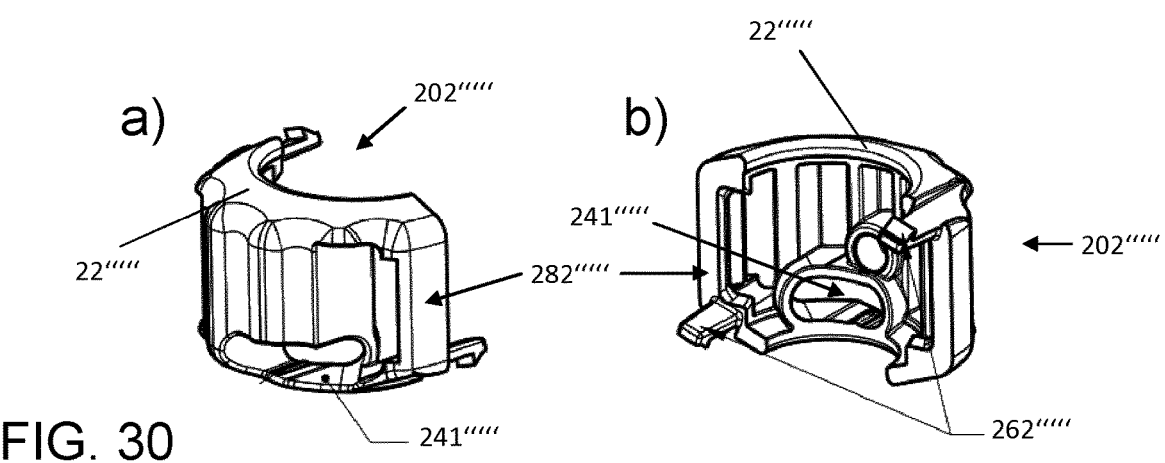
FIG. 30: two perspective views of a second half-ring segment according to the invention for forming a connection clamp according to the invention in said sixth embodiment.

FIG. 30, in a perspective front view (FIG. 30b)) and a perspective rear view (FIG. 30a)), depicts another half-ring segment according to the invention 202""" that is suited for use with a connection piece 10""" according to FIG. 28.

The half-ring segment 202""" shown in FIG. 30 has, on both segment ends of the half-ring segment 202""", tangentially extending latching means 282""" of the second type in the form of through-openings in which the latching means 281""" of the first type can engage and which have at least one latching recess 42""", 43""" in which the latching hook 294""" of the first latching means 281""" can engage.

In addition, the depicted half-ring segment 202""" has, on both segment ends, linear guide elements 262""" that are embodied in the form of latching tabs with a latching hook 291""" oriented outwards. The latching hook 291""" is not oriented radially outwards, but instead, is arranged slightly tilted on the half-ring segment 202'''''.

The linear guide elements 262''''' are arranged at different positions on each segment end. While the linear guide element 262''''' is arranged in the upper corner of the segment end on the right segment end depicted in FIG. 30b), the linear guide element 262''''' is arranged in the lower corner of the segment end on the left segment end shown in FIG. 30b).

Figure 31:
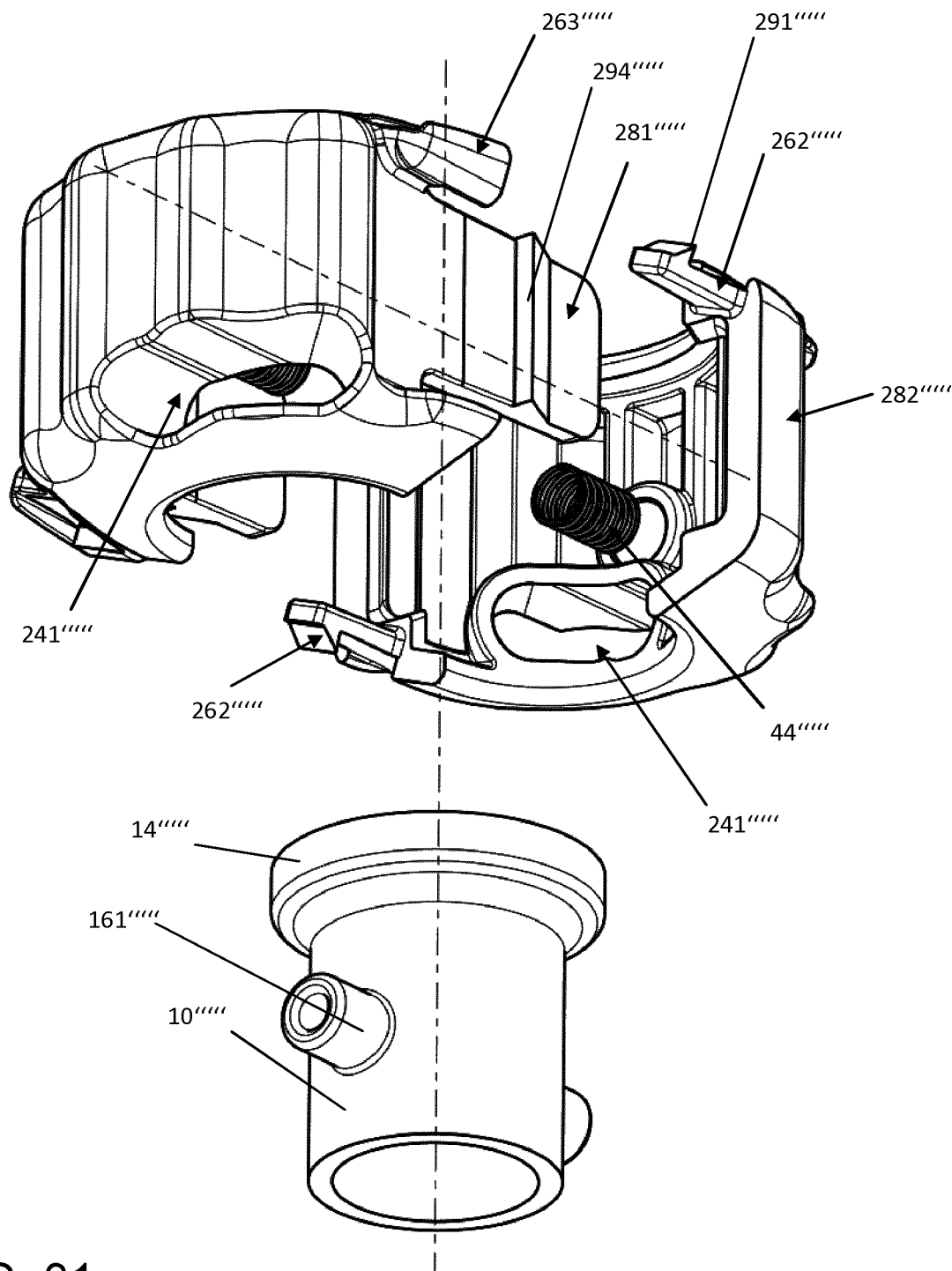
FIG. 31: a perspective view of the connection piece in FIG. 28 and two half-ring segments from FIG. 29 or 30 in the preparation position.

FIG. 31 depicts a perspective view of the connection piece in FIG. 28 and two half-ring segments in FIGS. 29 and 30 in a preparation position. Arranged between the segment ends of the half-ring segments 201''''', 202''''', in parallel with the latching means 281''''', 282''''' extending in a tangential direction, are elastic resetting elements 44''''', here in particular in the form of radially oriented helical springs (compression springs). Said helical springs are designed such that they apply a resetting force on the half-ring segments 201''''', 202''''', which counteracts the force necessary for moving the half-ring segments from a pre-assembly position into a final assembly position.

Figure 32:
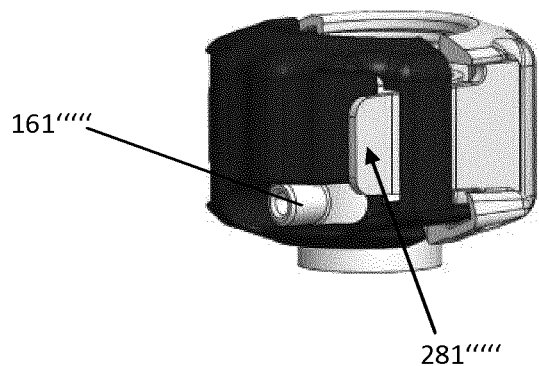
FIG. 32: a perspective view of the elements in FIG. 31 in the pre-assembly position.
Figure 33:
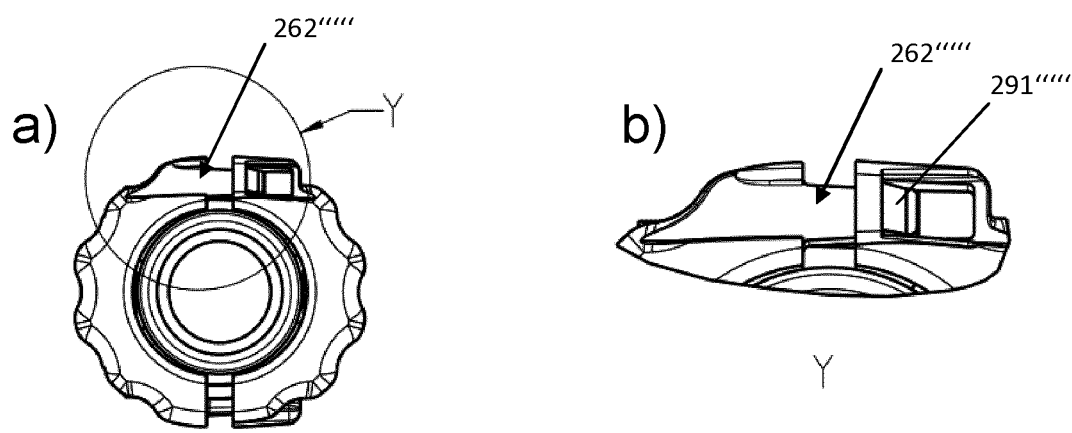
FIG. 33: a top view of the arrangement in FIG. 32 (FIG. 33a)) as well as a detail view (FIG. 33b))

FIGS. 32 and 33 depict the inventive elements in a pre-assembly position. In this position, the linear guide elements 262''''' of the half-ring segments 202''''' are at least partially arranged and latched in the linear guide elements 263''''' of the half-ring segment 201'''''. This defines a rotational position of each half-ring segment 201''''', 202''''' relative to the connection piece 10'''''. Due to the linear guide elements 262''''', 263''''', axial movement of the half-ring segments 201''''', 202''''' is limited relative to the connection piece 10'''''.

Additionally, in this position the latching hook 294''''' is latched in a latching recess 42''''' disposed on the interior side of the latching means 282''''' of the second type.

Figure 34:
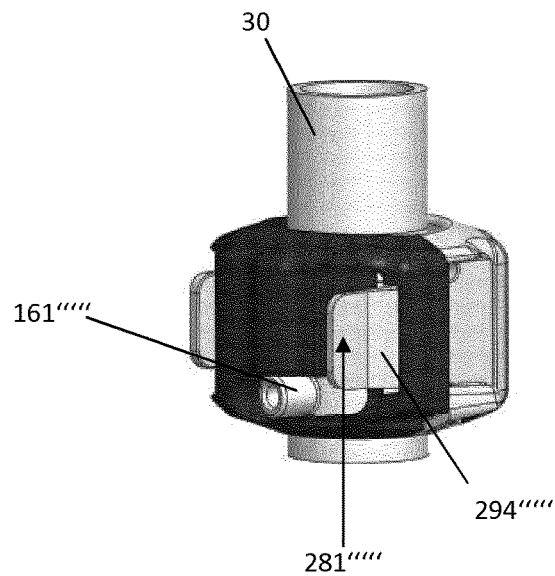
FIG. 34: a perspective view of the connection piece in FIG. 28 and two half-ring segments in FIG. 29 or 30 in the latched, non-rotated position.
Figure 35:
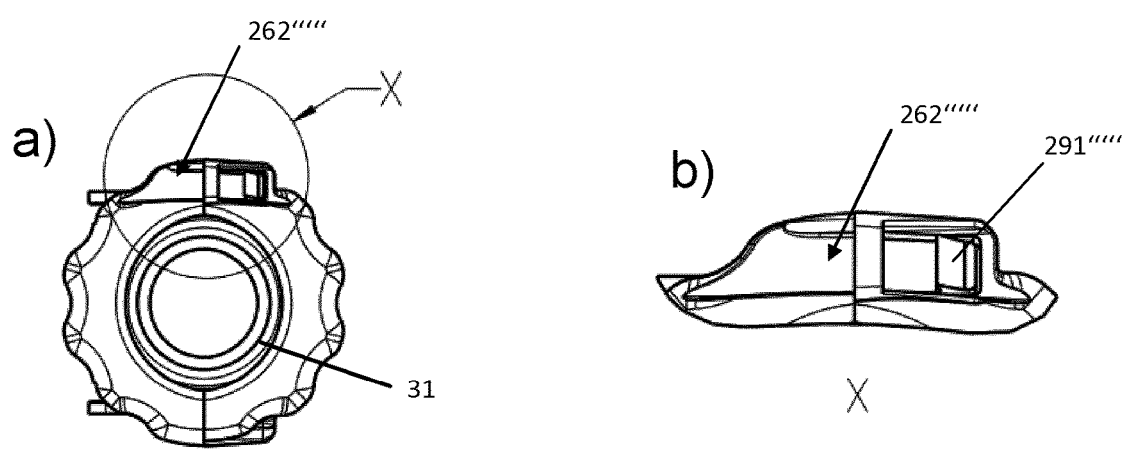
FIG. 35: a top view of the arrangement in FIG. 34.

FIGS. 34 through 35 depict the inventive elements in a latched, non-rotated final assembly position. Due to the further repositioning of the half-ring segments 201''''', 202''''' relative to one another, the latching hooks 294''''' are moved out of the latching recess 42''''' and engage in a latching recess 43''''' in the final assembly position.

Figure 36:
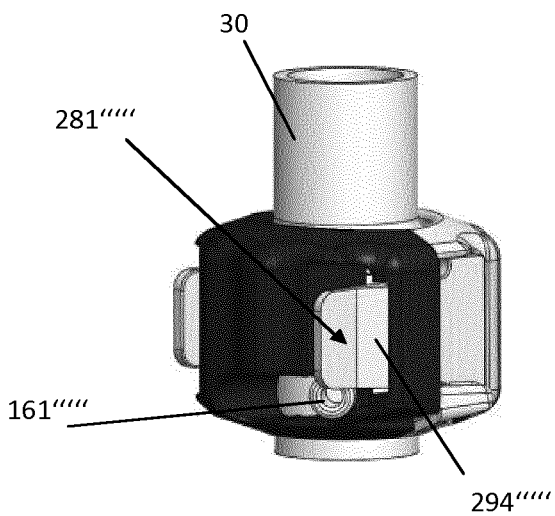
FIG. 36: a perspective view of the connection piece in FIG. 28 and two half-ring segments in FIG. 29 or 30 in the rotated final position.

FIG. 36 depicts the inventive elements in a rotated final position. The inventive elements are moved into a rotated final position using a rotational movement. The first threaded means 161''''' slide in the second threaded means 241''''' until the first threaded means 161''''' hit a stop. A rotation is normally 45°.

Figure 37:
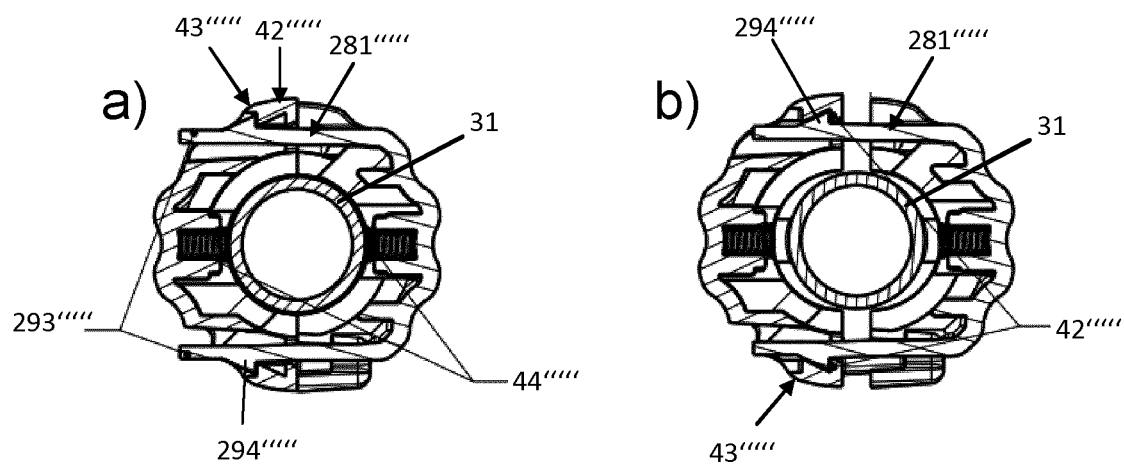
FIG. 37: a cross-sectional view through the arrangement in FIG. 36.

As shown in FIG. 37, in the present embodiment the half-ring segments 201''''', 202''''' can be moved from the final assembly position back to the pre-assembly position in that a force is applied to the release lever 293''''' of the latching means 281''''' of the first type, thus moving the latching hooks 294''''' out of the latching recesses 43''''', permitting the half-ring segments 201''''', 202''''' to be repositioned away from one another in a tangential direction.

Apart from this, what has been described in the foregoing essentially applies, with analogous elements being marked with quadruple primes, but otherwise identical in their reference numbers as used in FIGS. 1 through 27.

Of course, the embodiments discussed in the specific description and shown in the figures are merely illustrative exemplary embodiments of the present invention. In the light of the present disclosure a person skilled in the art has a broad spectrum of optional variations available. It will be obvious to the person skilled in the art that it is not absolutely necessary to follow the Tri-Clamp standard, which has been cited here repeatedly. Due to the wide proliferation of this standard, such a considered particularly advantageous, however. Adaptations to certain variants of the standard (e.g., Sanitary F, Sanitary S) are just as possible as are adaptations to other standards.

LIST OF REFERENCE NUMBERS 10, 10', 10'', 10''', 10'''', 10''''' Connection piece/pipe section
12 Container/capsule wall
14, 14',14'',14''', 14'''', 14'''''
141, 141',141'',141''', 141'''', 141''''' Contact surface
142 Seal
16, 16',16'',16''' Ramp ring
161'''', 161''''' Holding lug
18, 18',18'',18''' Wing
181, 181'''' Linear guide element (on connection piece)
181',181'',181''' Latching slot
182, 182',182'',182''' Latching corner
183, 183',183'' Stop edge
19, 19' Support wing
20, 20',20'',20''', 20'''' Half-ring segment
201''''' Half-ring segment
202''''' Half-ring segment
22, 22',22'',22''', 22'''', 22''''' Clamping flange
24, 24',24'',24''' Ramp section
241'''', 241''''' Slanted slot
26, 26'',26''' Guide wing
261, 261'',261''', 261'''' Linear guide element (on half-ring segment)
262'''', 262''''' Linear guide element (male threads)
263'''', 263''''' Linear guide element (female threads)
27 End stop
281, 281',281'',281''', 281'''', 281''''' Latching means of the first type
282, 282',282'',282''', 282'''', 282''''' Latching means of the second type
29 Safety latching boss
29'',29''' Latching rocker
291'',291''', 291'''', 291''''' Latching hook
292'',292''' Rocker axle
293'',293''', 293'''', 293''''' Release lever
294''''' Latching hook
200 Connection clamp
30 Additional line section
31 Contact flange of 30
40'''' Latching clamp
42'''', 42''''' Latching recess for pre-assembly position
43'''', 43''''' Latching recess for final position
44''''' Elastic resetting element

The invention claimed is:
1. A connection device comprising:
a line section with a contact flange at its end, protruding radially outwards for being contacted by a corresponding contact flange of an additional line section to be coupled to said line section, and
an annular connection clamp having:
a clamping flange protruding radially inwards, and an axial counter bearing spaced axially from said clamping flange, and
a first half-ring segment and a second half-ring segment, each of which has a first segment end and a second segment end,
wherein the first segment end of the first half-ring segment has latching means of a first type, and the second segment end of the second half-ring segment has corresponding latching means of a second type, which are pushed into one another in a tangential direction, thereby being latchable together, wherein the second segment end of the first-half ring segment has latching means of the second type, and the first segment end of the second ring segment has latching means of the first type, which are pushed into one another in a tangential direction, thereby being latchable with one another;

wherein the line section is embodied as a pipe-shaped connection piece having a first threaded means spaced axially from the contact surface of its contact flange, wherein the axial counter bearing of the connection clamp is embodied as a second threaded means corresponding to the first threaded means, wherein the pipe-shaped connection piece has first linear guide elements operatively extending in a tangential direction, and each one of the half-ring segments has, as a part of a wall of one of its segment ends, a corresponding second linear guide element corresponding to one of said first linear guide elements and operatively extending in the corresponding tangential direction, and wherein, by contacting with each other, the first and second linear guide elements urge the half-ring segments into linear opposition to each other with respect to their respective tangential directions when being latched together.

2. The connection device according to claim 1, wherein the first threaded means are embodied as ramp sections with slanted areas distributed over the circumference of the pipe-shaped connection piece, with said slanted areas of the ramp sections being arranged on their side facing away from the contact flange of the pipe-shaped connection piece, and wherein the second threaded means are embodied as ramp sections correspondingly distributed over the circumference of the connection clamp, with their slanted areas arranged on their sides facing the clamping flange of the connection clamp.

3. The connection device according to claim 1, wherein the first threaded means are embodied as a plurality of local holding lugs distributed over the circumference of the connection piece and projecting radially outwards, and wherein the second threaded means are embodied as an identical plurality of slanted slots in the walls of the half-ring segment, which are correspondingly distributed over the circumference of the connection clamp.

4. The connection device according to claim 1, wherein the pipe-shaped connection piece has first safety latching means acting radially outwards, and wherein one of the half-ring segments has corresponding second safety latching means acting radially inwards which, in their interacting state, counteract a rotation of the connection clamp relative to the connection piece in the release direction.

5. The connection device according to claim 4, wherein the second safety latching means are embodied as a manually releasable latching rocker.

6. The connection device according to claim 1, wherein the first linear guide element is embodied as a horizontally projecting wing with a radially projecting latching corner acting as a first safety latching means, and wherein the second safety latching means are embodied as a safety latching boss that protrudes radially inwards from the wall of the associated half-ring segment and are adjacent to an end stop also protruding radially inwards from the wall of the associated half-ring segment.

7. The connection device according to claim 1, wherein the first linear guide element is embodied as a local holding lug protruding radially outwards, and wherein the second linear guide element is embodied as a recess in the manner of a slanted slot, wherein the slanted slot has on its short side a through-opening for the first linear guide element.

8. The connection device according to claim 1, wherein the two half-ring segments are built identically.

9. The connection clamp according to claim 1, wherein the axial counter bearing is embodied as a ramp section or as a slanted slot.

10. The connection device according to claim 1, wherein the interacting first and second linear guide elements facilitate finding the rotational angle position in which the half-ring segments must be disposed relative to the pipe-shaped connection piece in order to be able to latch onto one another and to allow for the engagement of the first and second threaded means.

11. The connection device according to claim 1, wherein, during an interaction of the first and second linear guide elements, both an axial movement and a rotation of the half-ring segment relative to the connection piece are restricted.

* * * * *